(12) United States Patent  (10) Patent No.: US 12,555,417 B2
Düser  (45) Date of Patent: Feb. 17, 2026

(54) METHOD FOR TESTING A DRIVER ASSISTANCE SYSTEM OF A VEHICLE

(71) Applicant: AVL LIST GMBH, Graz (AT)

(72) Inventor: Tobias Düser, Bühl (DE)

(73) Assignee: AVL List GmbH, Graz (AT)

( * ) Notice: Subject to any disclaimer, the term of this patent is extended or adjusted under 35 U.S.C. 154(b) by 163 days.

(21) Appl. No.: 18/548,818

(22) PCT Filed: Feb. 28, 2022

(86) PCT No.: PCT/AT2022/060056
§ 371 (c)(1),
(2) Date: Sep. 1, 2023

(87) PCT Pub. No.: WO2022/183228
PCT Pub. Date: Sep. 9, 2022

(65) Prior Publication Data
US 2024/0177535 A1   May 30, 2024

(30) Foreign Application Priority Data

Mar. 1, 2021  (AT) .............................. A 50139/2021

(51) Int. Cl.
*G07C 5/06* (2006.01)
*G01S 7/40* (2006.01)
*G01S 13/931* (2020.01)

(52) U.S. Cl.
CPC ................. *G07C 5/06* (2013.01); *G01S 7/40* (2013.01); *G01S 13/931* (2013.01)

(58) Field of Classification Search
CPC . G07C 5/06; G01S 7/40; G01S 13/931; G06F 11/3696; G06F 11/3688;
(Continued)

(56) References Cited

U.S. PATENT DOCUMENTS 6,853,906 B1   2/2005  Michi et al.
10,228,693 B2 *  3/2019  Micks .................... G06N 20/00
(Continued)

FOREIGN PATENT DOCUMENTS

CN     101041355   9/2007
CN     103209876   7/2013
(Continued)

OTHER PUBLICATIONS

Vernaza et al. "Simul-A2: Agent-based Simulator for evaluate ADA Systems," 17th International Conference on Information Fusion (Fusion), International, Jul. 7, 2014, 7 pages.
(Continued)

*Primary Examiner* — Thomas Ingram
(74) *Attorney, Agent, or Firm* — Sheridan Ross P.C.

(57) ABSTRACT

The invention relates to a system for generating scenarios for the testing of a driver assistance system of a vehicle and a corresponding method, the system comprising: means for simulating a traffic situation comprising the vehicle and at least one further road user, where a first road user can be controlled by a first user; a first user interface for outputting a virtual environment based on the virtual traffic situation to the first user via a first, in particular at least visual, user interface; and a second user interface for capturing inputs of the first user for controlling the at least one first road user in the virtual environment; means for operating the driver assistance system in a virtual environment of the vehicle on the basis of the simulated traffic situation; means for capturing a scenario; and means for determining a quality factor of the resulting scenario.

16 Claims, 5 Drawing Sheets

(58) Field of Classification Search
CPC ...... G06F 30/15; G06F 30/20; G06F 11/3684; G09B 9/05; G09B 9/02; G01M 17/06; G01M 17/00; G01M 17/007; G06N 20/00
See application file for complete search history.

(56) References Cited

U.S. PATENT DOCUMENTS

| | | | |
|---|---|---|---|
| 10,399,565 | B2 | 9/2019 | Posch et al. |
| 10,482,003 | B1 | 11/2019 | Bondor et al. |
| 10,636,295 | B1* | 4/2020 | Kim .................. G08G 1/0129 |
| 10,913,455 | B2* | 2/2021 | Bruns .................. G06V 10/82 |
| 11,086,318 | B1* | 8/2021 | Davis .................. G05D 1/0212 |
| 11,137,763 | B2 | 10/2021 | Heit et al. |
| 11,244,096 | B2* | 2/2022 | Becht .................. G06F 30/3308 |
| 11,397,136 | B2 | 7/2022 | Schyr et al. |
| 11,417,057 | B2 | 8/2022 | Atsmon |
| 12,304,510 | B2 | 5/2025 | Hettel et al. |
| 2004/0176936 | A1 | 9/2004 | Ohtsu et al. |
| 2007/0063854 | A1 | 3/2007 | Zhang et al. |
| 2007/0182529 | A1 | 8/2007 | Dobler et al. |
| 2011/0313740 | A1 | 12/2011 | Ikeda et al. |
| 2012/0135382 | A1 | 5/2012 | Winston et al. |
| 2013/0238166 | A1 | 9/2013 | Breu et al. |
| 2015/0105936 | A1 | 4/2015 | Grineenval et al. |
| 2015/0149031 | A1 | 5/2015 | Pfister |
| 2016/0171133 | A1 | 6/2016 | Pfister |
| 2016/0210382 | A1 | 7/2016 | Alaniz et al. |
| 2016/0280233 | A1 | 9/2016 | Priller |
| 2016/0379091 | A1* | 12/2016 | Lin .................. G06V 10/776 382/156 |
| 2017/0132117 | A1* | 5/2017 | Stefan .................. G06F 11/3684 |
| 2017/0270236 | A1* | 9/2017 | Yamaura .................. G06F 30/20 |
| 2017/0278402 | A1* | 9/2017 | Yalla .................. G08G 1/096791 |
| 2017/0286570 | A1 | 10/2017 | Kim |
| 2017/0355377 | A1 | 12/2017 | Vijaya |
| 2018/0060467 | A1 | 3/2018 | Schulte et al. |
| 2018/0079425 | A1* | 3/2018 | Fleck .................. B60W 50/045 |
| 2018/0275658 | A1* | 9/2018 | Iandola .................. G06F 30/20 |
| 2018/0339706 | A1 | 11/2018 | Biondo |
| 2019/0047588 | A1 | 2/2019 | Yabuuchi |
| 2019/0111933 | A1* | 4/2019 | Schoeggl ............ B60W 60/0011 |
| 2019/0155291 | A1 | 5/2019 | Heit et al. |
| 2019/0179738 | A1 | 6/2019 | Hawthorne et al. |
| 2019/0195734 | A1 | 6/2019 | Breton |
| 2019/0225235 | A1* | 7/2019 | Schyr .................. G01M 17/007 |
| 2019/0303759 | A1 | 10/2019 | Farabet |
| 2020/0003869 | A1 | 1/2020 | Yang et al. |
| 2020/0183387 | A1* | 6/2020 | Heit .................. G05D 1/0088 |
| 2020/0209874 | A1* | 7/2020 | Chen .................. B60W 50/04 |
| 2020/0216078 | A1 | 7/2020 | Katz |
| 2021/0163029 | A1 | 6/2021 | Lutz et al. |
| 2021/0237743 | A1 | 8/2021 | Bostrom |
| 2021/0291839 | A1 | 9/2021 | Hutchings |
| 2022/0048536 | A1* | 2/2022 | Kaplan .............. B60W 60/0011 |
| 2022/0185322 | A1* | 6/2022 | Liu .................. B60W 50/045 |
| 2023/0043713 | A1 | 2/2023 | Sakurai |
| 2023/0072952 | A1 | 3/2023 | Dueser |
| 2023/0214712 | A1 | 7/2023 | Furlan et al. |
| 2023/0343153 | A1 | 10/2023 | Schlömicher et al. |
| 2024/0010210 | A1* | 1/2024 | Bannenberg ...... B60W 50/0205 |
| 2024/0311279 | A1 | 9/2024 | Düser |

FOREIGN PATENT DOCUMENTS

| | | |
|---|---|---|
| CN | 105718065 | 6/2016 |
| CN | 108319259 | 7/2018 |
| CN | 108345290 | 7/2018 |
| CN | 108646586 | 10/2018 |
| CN | 108681264 | 10/2018 |
| CN | 109285372 | 1/2019 |
| CN | 110599864 | 12/2019 |
| CN | 212579772 | 2/2021 |
| CN | 110949396 | 11/2021 |
| DE | 4200694 | 7/1993 |
| DE | 19614061 | 10/1996 |
| DE | 102007031040 | 1/2009 |
| DE | 102007043910 | 3/2009 |
| DE | 102008002699 | 12/2009 |
| DE | 102009028767 | 2/2011 |
| DE | 102010029922 | 12/2011 |
| DE | 102011000409 | 8/2012 |
| DE | 102011087781 | 6/2013 |
| DE | 102011088807 | 6/2013 |
| DE | 102011121537 | 6/2013 |
| DE | 102012001666 | 8/2013 |
| DE | 102012002333 | 8/2013 |
| DE | 102012201896 | 8/2013 |
| DE | 102013200116 | 7/2014 |
| DE | 102014118625 | 6/2016 |
| DE | 102015104890 | 10/2016 |
| DE | 102018200011 | 7/2019 |
| DE | 102018205804 | 10/2019 |
| DE | 102019105363 | 10/2020 |
| DE | 102019206049 | 10/2020 |
| DE | 102019206052 | 10/2020 |
| EP | 0836945 | 4/1998 |
| EP | 1998160 | 12/2008 |
| EP | 2284057 | 2/2011 |
| EP | 3438901 | 2/2019 |
| EP | 3745381 | 12/2020 |
| EP | 3745382 | 12/2020 |
| JP | 2008-123197 | 5/2008 |
| JP | 2008-146332 | 6/2008 |
| JP | 2015-516623 | 6/2015 |
| JP | 2016-531044 | 10/2016 |
| JP | 2017-105453 | 6/2017 |
| JP | 2017-173309 | 9/2017 |
| JP | 2019-537703 | 12/2019 |
| KR | 10-2009-0016183 | 2/2009 |
| WO | WO 2004/045895 | 6/2004 |
| WO | WO 2012/088635 | 7/2012 |
| WO | WO 2015/032508 | 3/2015 |
| WO | WO 2017/210222 | 12/2017 |
| WO | WO 2019/108985 | 6/2019 |
| WO | WO 2019/201400 | 10/2019 |
| WO | WO 2019/220436 | 11/2019 |
| WO | WO 2020/083996 | 4/2020 |

OTHER PUBLICATIONS

Official Action with Machine Translation for Austria Patent Application No. A 50139/2021, dated Dec. 15, 2021, 8 pages.

International Search Report and Written Opinion for International (PCT) Patent Application No. PCT/AT2022/060056, dated Jun. 23, 2022, 12 pages.

English Translation of the International Search Report for International (PCT) Patent Application No. PCT/AT2022/060056, dated Jun. 23, 2022, 2 pages.

"ASAM OpenScenario: User Guide," ASAM e.V., last updated Mar. 16, 2020, Version 1.0.0, 54 pages.

Bako Rajaonah et al: "Trust and the use of adaptive cruise control: a study of a cut-in situation", Cognition, Technology & Work, Springer-Verlag, LO, vol. 8, No. 2, Mar. 14, 2006; pp. 146-155.

Elrofai et al. "Scenario-Based Safety Validation of Connected and Automated Driving," StreetWise, TNO, Jul. 1, 2018, pp. 1-28 [Retrieved online from: publications.tno.nl/publication/34626550/AyT8Zc/TNO-2018-streetwise.pdf].

Erdogan et al. "Real-World Maneuver Extraction for Autonomous Vehicle Validation: A Comparative Study," IEEE, 2019 IEEE Intelligent Vehicles Symposium (IV), Jun. 9-12, 2019, Paris, France, pp. 267-272.

MSC Software "Virtual Test Drive (VTD): Webinar-Leverage Simulation to Achieve Safety for Autonomous Vehicles," YouTube, Jun. 10, 2019, 39 pages [retrieved online from: www.youtube.com/watch?v=NksyrGA8Cek].

Sun et al. "Using virtual instruments to develop an actuator-based hardware-in-the-loop simulation test-bed for autopilot of unmanned aerial vehicle," Proceedings of SPIE, 2008, vol. 7130 (1), pp. 71301J-71301J-6 (Abstract only).

(56) References Cited

OTHER PUBLICATIONS

Leo's Variety Channel, "Rear view camera replacement 2010 2011 2012 2013 2014 Ford F-150," Youtube, Aug. 16, 2018, 5 pages [retrieved online from: www.youtube.com/watch?v=RpVZkCI4FmE].
Solmaz et al. "A Novel Testbench for Development, Calibration and Functional Testing of ADAS/AD Functions," IEEE, 2019 IEEE International Conference on Connected Vehicles and Expo (ICCVE), Nov. 2019, 8 pages.

* cited by examiner

Legend:

vehicle with function to be tested simulated traffic driven by real driver construction site generated by real user

METHOD FOR TESTING A DRIVER ASSISTANCE SYSTEM OF A VEHICLE

CROSS REFERENCE TO RELATED APPLICATIONS

This application is a national stage application under 35 U.S.C. 371 and claims the benefit of PCT Application No. PCT/AT2022/060056 having an international filing date of 28 Feb. 2022, which designated the United States, which PCT application claimed the benefit of Austria Patent Application No. A 50139/2021 filed 1 Mar. 2021, the disclosures of each of which are incorporated herein by reference in their entireties.

FIELD OF THE INVENTION

The invention relates to a computer-implemented method for the testing of at least one driver assistance system for a vehicle. The invention further relates to a corresponding system for the testing of at least one driver assistance system.

BACKGROUND

The proliferation of driver assistance systems (Advanced Driver Assistance Systems—ADAS), which in a further development enables autonomous driving (Autonomous Driving—AD), keeps increasing in both the passenger car as well as the commercial vehicle sectors. Driver assistance systems make an important contribution to increasing active traffic safety and serve in enhancing driving comfort.

In addition to systems which in particular serve driving safety such as ABS (anti-lock braking system) and ESP (electronic stability program), a plurality of driver assistance systems are touted in the passenger and commercial vehicle sectors.

Driver assistance systems which are already being used to increase active road safety are park assist and adaptive automatic vehicle interval control, also known as Adaptive Cruise Control (ACC), which adaptively adjust a desired speed selected by a driver to the distance from a vehicle driving in front. A further example of such driver assistance systems are ACC stop-and-go systems which, in addition to ACC, effect the automatic further travel of the vehicle in a traffic jam or stationary traffic, lane departure warning or lane assist systems which automatically keep the vehicle in its lane, and pre-crash systems which for example ready or initiate braking in the event of a possible collision in order to draw the kinetic energy out of the vehicle as well as potentially initiate further measures should a collision be unavoidable.

These driver assistance systems increase safety in traffic by both warning the driver of critical situations as well as initiating autonomous intervention to avoid or minimize accidents, for example by activating an emergency braking function. Additionally, functions like automatic parking, automatic lane-keeping and automatic proximity control increase driving comfort.

A driver assistance system's gains in safety and comfort are only perceived positively by the vehicle's occupants when the aid provided by the driver assistance system is safe, reliable and—wherever possible—convenient.

Moreover, every driver assistance system, depending on its function, needs to handle given traffic scenarios with maximum safety for the vehicle itself and without endangering other vehicles or other road users respectively.

SUMMARY OF THE INVENTION

The respective degree of vehicle automation is divided into so-called automation levels 1 to 5 (see e.g., the SAE J3016 standard). The present invention relates in particular to vehicles having driver assistance systems at automation level 3 to 5, which is generally considered autonomous driving.

There are many diverse challenges in testing such systems. In particular, a balance needs to be found between the testing effort and the testing coverage. The main task when testing ADAS/AD functions is thereby to demonstrate the guaranteed function of the driver assistance system in all conceivable situations, particularly including critical driving situations. Such critical driving situations involve a certain degree of danger since no reaction or a wrong reaction by the respective driver assistance system can lead to an accident.

The testing of driver assistance systems therefore requires allowing for a large number of driving situations which may arise in different scenarios. The range of possible scenarios thereby generally spans many dimensions (e.g., different road characteristics, behavior of other road users, weather conditions, etc.). From this virtually infinite and multidimensional range of parameters, it is particularly relevant in the testing of driver assistance systems to extract those parameter constellations for critical scenarios which can lead to unusual or dangerous driving situations.

As depicted in FIG. 1, such critical scenarios have a far lower probability of occurrence than normal scenarios.

In order to validate a corresponding driver assistance system, scientific publications consider that operating a vehicle in autonomous driving operation is only statistically safer than a human-controlled vehicle when the respective driver assistance system has completed 275 million miles of accident-free driving. This is practically impossible to realize with real test drives, particularly considering the very tight development cycles and quality standards required in the automotive industry. For the aforementioned reason, it would also be unlikely that a sufficient number of critical scenarios, or driving situations resulting from these scenarios respectively, would be incorporated.

Using real test drive data from a real fleet of test vehicles to validate and verify driver assistance systems and to extract scenarios from the recorded data is known from the prior art. Furthermore, using full factorial designs for validation and verification is also known.

One task of the invention is that of being able to check driver assistance systems, particularly autonomous driving functions, in critical scenarios. In particular a task of the invention is that of identifying critical scenarios for driver assistance systems.

This task is solved by the teaching of the independent claims. Advantageous embodiments are found in the dependent claims.

A first aspect of the invention relates to a computer-implemented method for the testing of a driver assistance system of a vehicle having the following work steps:

simulating a virtual traffic situation comprising the vehicle and at least one further road user, wherein a first road user can be controlled by a first user and wherein further road users not able to be controlled by users are automatically controlled, in particular by artificial intelligence or by logic-based control;

outputting a virtual environment of the at least one first road user on the basis of the virtual traffic situation to the first user via a first, in particular an at least visual, user interface;

capturing inputs of the first user (2) for controlling the at least one first road user in the virtual environment of the first road user via a second user interface, wherein the captured inputs of the first user and the resulting interaction of the at least one first road user with its virtual environment are factored into the simulating of the virtual traffic situation;

operating the driver assistance system in a virtual environment of the vehicle on the basis of the simulated traffic situation, wherein the driver assistance system displays a driving behavior;

capturing a scenario resulting from the driving behavior of the driver assistance system in the virtual environment of the vehicle;

determining a quality factor of the resulting scenario as a function of a predefined criterion, in particular a dangerousness of the resulting scenario; and outputting the quality factor to the user via the first or a second user interface, particularly a display.

A second aspect of the invention relates to a system for generating scenario data for the testing of a driver assistance system of a vehicle which comprises:

means for simulating a virtual traffic situation comprising the vehicle and at least one further road user, wherein a first road user can be controlled by a first user and wherein further road users not able to be controlled by users are automatically controlled, in particular by artificial intelligence or by logic-based control;

a first, in particular at least visual, user interface for outputting a virtual environment of at least one first road user to the first user on the basis of the virtual traffic situation via a first in particular at least visual, user interface; and a second user interface for capturing inputs of the first user for controlling the at least one first road user in the virtual environment of the first road user via a second user interface, wherein the captured inputs of the first user and the resulting interaction of the at least one first road user with its virtual environment are factored into the simulating of the virtual traffic situation;

means for operating the driver assistance system in a virtual environment of the vehicle on the basis of the simulated traffic situation, whereby the driver assistance system displays a driving behavior;

means for capturing a scenario resulting from the driving behavior of the driver assistance system in the virtual environment of the vehicle; and means for determining a quality factor of the resulting scenario as a function of a predefined criterion, in particular a dangerousness of the resulting scenario;

wherein the first or second user interface, in particular a display, is further configured to output the quality factor to the user.

Further aspects of the invention relate to a computer program and a computer-readable medium.

A user within the meaning of the invention is a natural person; i.e., a human.

A driver assistance system within the meaning of the invention is preferably configured to support a driver during the process of driving or at least partially control a vehicle, in particular a driver assistance system at automation level 3 to 5 or, further particularly, an autonomous driving function.

A road user within the meaning of the invention is preferably any object taking an active part in traffic. In particular, a road user is a person, an animal or a vehicle.

Extraction within the meaning of the invention preferably denotes a segregating or isolating.

In particular, scenarios are segregated or respectively isolated from the scenario data. Data ranges are thereby preferably selected within the scenario data.

Scenario data within the meaning of the invention is preferably characterized by the position and movement of the road users and the position of static objects in respect of a scenario.

A scenario within the meaning of the invention is preferably formed from a chronological sequence of, in particular static, scenes. The scenes thereby indicate, for example, the spatial arrangement of the at least one other object relative to the ego object, e.g., the constellation of road users. A scenario preferably factors in dynamic and static content. Preferably, a model for the systematic description of scenarios is used here, further preferably the model of the PEGASUS project (https://www.pegasusprojekt.de) with the following six independent layers: 1. road (geometry, . . . ); 2. road furnishings and rules (traffic signs, . . . ); 3. temporary modifications and events (road construction, . . . ); 4. moving objects (traffic-relevant objects such as: vehicles, pedestrians, . . . moving relative to the vehicle under testing); 5. environmental conditions (lighting situation, road weather, . . . ); 6. digital information (V2X, digital data/map, . . . ). A scenario can in particular include a driving situation in which a driver assistance system at least partially controls the vehicle equipped with the driver assistance system, called the ego vehicle, e.g., autonomously performs at least one vehicle function of the ego vehicle.

A traffic situation within the meaning of the invention preferably describes the totality of all the road user circumstances in traffic within a defined spatial area and/or defined period of time or point in time. Preferably, these road user circumstances are factored into the selection of applicable behavioral patterns at a specific point in time. Preferably, a traffic situation includes all relevant conditions, possibilities and determinants of actions. Although not imperative, a traffic situation can be represented from the point of view of a road user or object.

The simulated measured variables within the meaning of the invention are preferably selected from the following group: road user speed, in particular an initial speed; direction of movement, in particular a road user's trajectory; lighting conditions; weather; road surface; temperature; number and position of static and/or dynamic objects; speed and direction of movement, in particular trajectory, of the dynamic objects; condition of signaling systems, in particular traffic light systems; traffic signs; number of lanes; acceleration or braking deceleration of road users or objects.

A predefined constellation of measured variables within the meaning of the invention is preferably a constellation of values of one or more measured variables, particularly in a chronological sequence.

Labeling within the meaning of the invention preferably means the providing of a categorizing designation.

Scenario dangerousness within the meaning of the invention preferably denotes the spatial or temporal proximity to a traffic situation without any possible accident-free outcome (by one's own efforts and in consideration of the noted uncertainties). When an accident can no longer be avoided, the dangerousness is at its maximum. Preferably, dangerousness is also referred to as criticality.

When the driving behavior or driving ability of a driver assistance system is taken into account, dangerousness can characterize a probability of an accident and/or a calculated duration up to a point in time of collision. Maximum dangerousness preferably exists when the calculated duration is 0 seconds and/or the accident probability is P=1. An increased accident probability can in particular be triggered by a driving maneuver, for example an evasive reaction or pronounced gradient changes during steering, braking, accelerating (thus e.g., a vehicle swerving due to sharp steering). An increased accident probability, in particular with respect to the other road users (in logic or AI-based guidance) and in a critical driving situation, can also force contravention of its driving task or its actual trajectory respectively (through an evasive maneuver). An increased accident probability can in particular also be caused by external factors affecting the first road user or the other road users, for example when a driver is blinded.

A quality factor within the meaning of the invention preferably characterizes the simulated scenario. A quality factor is preferably understood as a quality or nature and/or a relevance of the simulated scenario in relation to the dangerousness of a driving situation for a specific driver assistance system.

Relevance within the meaning of the invention is preferably understood as the frequency at which a scenario occurs in road traffic. For example, a backlit scenario is more relevant than a scenario in which an airplane lands on the roadway. The relevance preferably also depends on the region for which the road traffic is relevant. For example, there are scenarios which are relevant in Germany but not in China.

An environment of the vehicle within the meaning of the invention is preferably formed at least by the road users and other objects relevant to the vehicle guidance provided by the driver assistance system. In particular, the environment of the vehicle encompasses scenery and dynamic elements. The scenery preferably includes all stationary elements.

An abort condition within the meaning of the invention is preferably objectively defined or can also be effected by user input.

A means within the meaning of the invention can be designed as hardware and/or software, in particular as a processing unit, particularly a digital processing unit, in particular a microprocessor unit (CPU), preferably data-connected or signal-connected to a memory and/or bus system and/or having one or more programs or program modules. The CPU can be configured to process commands implemented as a program stored in a memory system, capture input signals from a data bus and/or send output signals to a data bus. A memory system can comprise one or more, in particular different, storage media, particularly optical, magnetic, solid-state and/or other non-volatile media. The program can be designed so as to embody or be capable of performing the methods described herein such that the CPU can execute the steps of such methods and then in particular generate scenarios.

The invention is based on the approach of animating real people to generate scenarios, however without requiring any test drives in real traffic.

According to the invention, the real driver namely maneuvers a vehicle within a simulated traffic situation, in particular in a virtual environment or a virtual environment created by the simulated traffic situation respectively. The invention enables a crowdsourcing approach to generating scenarios. One or more users can now navigate a road user of their choice through virtual traffic situations on a simulator. Due to the virtually endless possibility of navigating options for the road user(s) as well as other aleatory mechanisms when simulating the virtual traffic situation, a virtually endless number of different scenarios can occur, just like in real traffic. The invention uses predefined criteria to determine between occurrences of known or new scenarios. To that end, the simulation process and in particular the simulation data generated therefrom are continuously analyzed/monitored.

The crowdsourcing approach can thereby capitalize on people's natural play instinct. The inventive method or even a suitable system can thus be provided to users. These users can then drive around in the simulated traffic "for fun." Alternatively, tasks could also be set for the users, for example getting from point A to point B as quickly as possible while observing traffic regulations or having to collect certain objects at different places. Furthermore, the user could be distracted when navigating through the simulated traffic, e.g., needing to provide specific vocal inputs or the like.

The simulation physics thereby correspond to reality so as to generate the most realistic scenario data possible. This applies in particular to the physical properties of the road users and those of the environment. Driving through objects or the like is not possible. Particularly preferentially, a plurality of users navigate a plurality of road users in the simulated traffic.

Feedback of the scenario's quality factor to the user communicates the quality or dangerousness of a scenario resulting from his activity. The user can then attempt to increase the quality factor by adapting his behavior in controlling the road user which he controls Preferably, he can request the simulation means simulating the scenario to repeat a previously run scenario. In this way, he can optimize his control behavior for as long as needed until he achieves the best possible quality factor; i.e., the greatest dangerousness, relative to a specific scenario, particularly in compliance with the traffic regulations.

Preferably, the resulting driving situation is recorded as scenario data so it can be reproduced later in a simulated scenario.

In one advantageous embodiment of the method, the scenario data thereby generated is already labeled, in particular objects of the virtual traffic situation are labeled. Information about object properties is available in the simulation so that the information can be associated with the objects.

This is particularly an advantage over data from a real test operation in which all the objects need to be labeled. This labeling is generally very laborious since it can only be done by actual people.

In one advantageous embodiment of the method, the simulated scenario of ascertained quality factor is changed until an abort condition is reached. Preferably, the simulated scenario is additionally or alternatively output until its quality factor reaches an abort condition. Further preferably, the simulated scenario is only output when its quality factor has reached the abort condition. In this case, the test procedure is resumed or respectively repeated until the driving behavior of the user and/or the simulation of the scenario results in a driver assistance system behavior breaching a predefined target value serving as the abort condition. Such an abort condition can be, for example, a duration of less than 0.25 seconds until a point in time of collision or even a specific time budget, e.g., maximum 600 hours simulation time.

Assuming a sufficiently long enough time budget, the invention enables achieving high probability of the proper functioning of the ADAS or AD system.

In a further advantageous embodiment of the method, modification is at least partly done by the user via the first user interface or the second user interface using an editor, wherein user operations are preferably recorded and stored in a control table. The possibility of modifying the scenario not only enables the user to influence the resulting driving situation through his driving behavior but also directly influence the simulated driving scenario. He thereby has a further influence on the quality factor of the resulting driving situation. The user can thus optimize an existing driving scenario so as to yield driving situations with the highest possible quality factor in tandem with his driving behavior.

In a further advantageous embodiment of the method, a speed of the vehicle, in particular an initial speed, and/or a trajectory of the vehicle is predefined when simulating the scenario. These defaults are boundary conditions in the testing of the driver assistance system and can preferably likewise be changed by the user.

In a further advantageous embodiment of the method, only parameter values of the simulated scenario are changed when changing the simulated scenario. The nature of the respectively simulated scenario therefore remains. New parameters are not to be added, e.g., through the addition of further vehicles. The user thereby remains in the respectively simulated scenario under testing and not a completely newly created scenario.

In a further advantageous embodiment of the method, the parameters of the scenario are selected from the following group depending on the type of driver assistance system being tested:

speed, in particular an initial speed, of a road user; direction of movement, in particular a road user's trajectory; lighting conditions; weather; road surface; temperature; number and position of static and/or dynamic objects; speed and direction of movement, in particular trajectory, of the dynamic objects; condition of signaling systems, in particular traffic light systems; traffic signs; number of lanes; acceleration or braking deceleration of road users or objects.

Changing these parameters can significantly influence scenario dangerousness.

In a further advantageous embodiment of the method, the quality factor is characterized by a reward, in particular a notional reward, for the user. In particular, the user receives a credited reward, e.g., to a virtual account, depending on the quality factor reached. What this can achieve is the user always attempting to realize driving situations of higher quality factors.

In a further advantageous embodiment of the method, the quality factor is higher the more dangerous the respectively resulting scenario, in particular the shorter the calculated duration until a time point of collision. This has the advantage of the most critical driving situations possible being identified, even though they only occur very rarely in normal traffic. The number of test kilometers to be completed can be reduced to this.

In a further advantageous embodiment of the method, the simulated scenario is changed using evolutionary algorithms. Evolutionary algorithms are also referred to as genetic algorithms. Making changes by way of such algorithms entails different algorithms being crossed and mutated. Candidates for the next iterative step; i.e., the next variant of the simulated scenario, are formed from the algorithms thereby resulting.

In a further advantageous embodiment of the method, a utility function is approximated on the basis of the determined quality factor which specifies the quality factor value exhibited by a specific simulated scenario. Doing so enables calculating a reward for a user.

In a further advantageous embodiment of the method, the driver assistance system is simulated. This means that, in accordance with the "software-in-the-loop" concept, only the software, or the actual code of the driver assistance system respectively, is considered or respectively implemented when simulating the virtual traffic situation. This thereby enables pure simulation-based testing of a driver assistance system. A stimulation or a providing of signals to a real driver assistance system is thereby not required.

In a further advantageous embodiment of the method, historical data from earlier test operations of a driver assistance system, in particular the driver assistance system, are factored into the initial simulating of the scenario.

The use of historical data can be employed to pre-train an algorithm used for simulating traffic scenarios. Doing so can reduce the duration it takes to determine critical scenarios. Moreover, algorithms trained on another, in particular similar, ADAS/AD system can also be used. In particular, so-called regression tests can thus be run in order to ensure that changes to already tested parts of the driver assistance system software do not cause new errors.

In a further advantageous embodiment of the method, data relating to the environment of the vehicle is fed into the driver assistance system during the operation of the driver assistance system and/or the driver assistance system, in particular its sensors, is stimulated on the basis of the vehicle's environment. This embodiment enables the testing of a real driver assistance system or even a real vehicle having such a real driver assistance system.

Doing so enables the testing of the driver assistance system, in particular its software or the entire hardware, on a test bench. In particular, a hardware-in-the-loop method can be employed to that end.

The features and advantages mentioned above in relation to the first aspect of the invention also apply correspondingly to the other aspects of the invention and vice versa.

BRIEF DESCRIPTION OF THE DRAWINGS

Further features and advantages are yielded by the following description of exemplary embodiments referencing the figures. Shown therein at least partly schematically.

DETAILED DESCRIPTION

Figure 1:
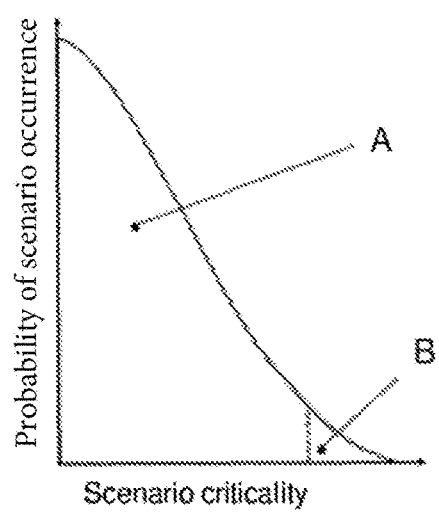
FIG. 1 a diagram of scenario occurrence probability as a function of their criticality and/or dangerousness.

FIG. 1 shows the probability of occurrence of scenarios as a function of scenario criticality and/or dangerousness. The probability of occurrence is the probability at which scenarios occur in actual road traffic.

Noticeable in FIG. 1 is that the majority of scenarios are of comparatively low complexity and/or dangerousness, which also corresponds to the general life experience of a motorist. The range of these scenarios is designated "A" in FIG. 1. In contrast, scenarios of high complexity, their range designated "B" in FIG. 1, occur comparatively infrequently. Yet it is precisely those "B" scenarios of great complexity which are highly relevant to analyzing the functionality of driver assistance systems.

Therefore, obtaining a sufficient number and diversity of different scenarios of high "B" complexity during the testing of a driver assistance system typically requires running a very large number of scenarios based on the distribution curve as shown. An alternative approach will be described in the following in which those scenarios of great complexity are specifically induced for the purpose of testing driver assistance systems, thus reducing the number of scenarios to run through and accordingly the number of kilometers to be covered.

A method for generating a large number of different scenarios having the greatest possible complexity for testing driver assistance systems is described below with reference to FIG. 2 to FIG. 3b.

A virtual traffic situation 3 in which a driver assistance system 7 is to be tested is simulated in a first work step 101. The virtual traffic situation 3 has a plurality of virtual road users 1, 4, 5a, 5b, 5c, 5d, 6, wherein the vehicle 1 is controlled by the driver assistance system 7 under testing. Preferably, at least one further first road user 4 of the plurality of road users can be controlled by a first user 2 and those road users 5a, 5b, 5c, 5d, 6 not able to be controlled by users are controlled automatically in this virtual traffic situation 3. An artificial intelligence or logic-based control is preferably used here. Preferably, there can be a plurality of road users controlled by users; i.e., humans, in the simulated virtual traffic situation 3. A plurality of driver assistance systems 7 in a single vehicle or multiple vehicles can also be tested at the same time.

A traffic flow model is preferably used to simulate the virtual traffic situation, in particular PTV-Vissim® or Eclipse SUMO, particularly version 1.8.0.

There are substantially two approaches relative to simulating the virtual traffic situation: The simulation is based on data obtained in a real test drive. In this case, the parameters of individual objects, e.g., road user speed, can be changed or also adopted as captured during the real test drive. In an alternative embodiment of the method, the traffic situation 3 is generated purely on the basis of mathematical algorithms. Preferably, there can also be a mix of the two approaches.

Figure 3A:
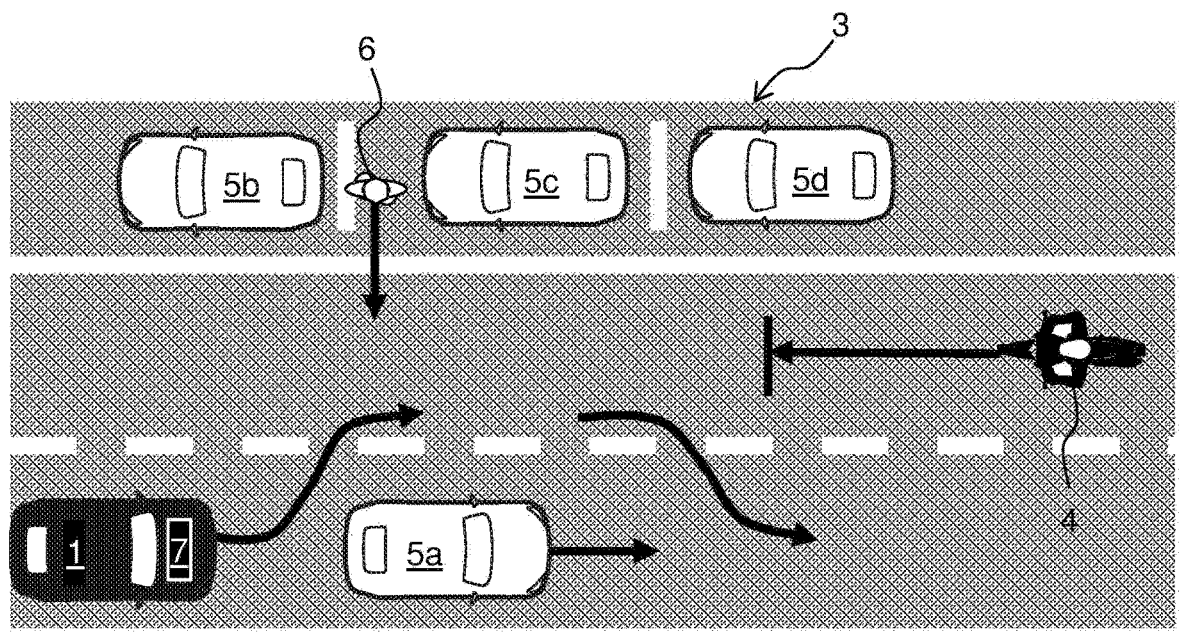
FIG. 3a a first example of a simulated virtual traffic situation.

An example of such a simulated traffic situation 3 is shown in FIG. 3a. In the traffic situation 3 shown in FIG. 3a, a pedestrian 6 is crossing a road. A motorcycle 4, which is controlled by the first user, approaches the pedestrian 6 in the lane to the side of the pedestrian 6. Other vehicles 5b, 5c, 5d are parked alongside the traffic lane, making the pedestrian 6 not or only poorly visible to the motorcycle 4 controlled by the first user 2. A further vehicle 5a level with the pedestrian 6 is driving in the second lane for oncoming traffic. A vehicle 1 is approaching behind the other vehicle 5a, its longitudinal and lateral control being effected by a driver assistance system 7. Whether this motorcyclist 4 is visible to the vehicle 1 controlled by the first user 2 cannot be deduced from FIG. 3a.

The other vehicles 5a, 5b, 5c, 5d, the pedestrian 6 as well as the motorcyclist 4 form a virtual environment of the vehicle 1 controlled by the driver assistance system in the traffic situation 3. Correspondingly, the further vehicles 5a, 5b, 5c, 5d and the pedestrian 6 form a virtual environment of the motorcycle 4 controlled by the user in the traffic situation 3.

Based on how the first user 2 reacts or acts in the initial scenario which results from traffic situation 3, i.e., which driving behavior the first user 2 exhibits in the virtual environment of the motorcycle 1 he controls, a dangerous or less dangerous scenario will result. In general, the respective scenario is more dangerous the more complex it is and thus the more difficult it is for a driver assistance system 7 to process. For example, if the first user 2 brakes the motorcycle 4 to a stop, as indicated in FIG. 3a by the bar in front of the movement arrow of motorcycle 4, the vehicle 1 controlled by the driver assistance system can pass the oncoming vehicle 5a in the other lane 5a without any trouble.

Figure 3B:
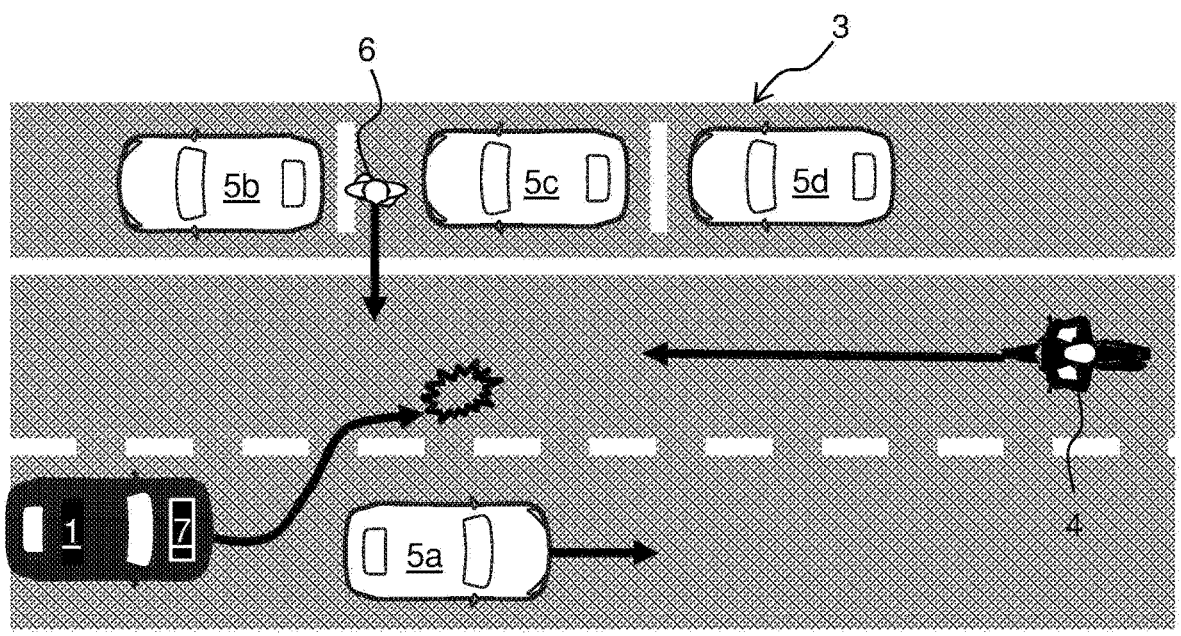
FIG. 3b a second example of a simulated virtual traffic situation.

FIG. 3b shows the same virtual traffic situation 3 as FIG. 3a in which the motorcycle controlled by the first user 2 is in the same initial traffic situation as in FIG. 3a. As indicated by the movement arrow coming off of the motorcycle 4 controlled by the first user 2, the first user 2 continues driving it at undiminished speed.

Given this, it is highly probable that a scenario will develop in which the motorcyclist 4 collides with the vehicle 1 controlled by the first driver assistance system 7. This is also indicated in FIG. 3b. Such a driving situation/scenario would correspond to very high dangerousness.

Preferably, an initial speed and/or initial trajectory of vehicle 1 and/or motorcycle 4 is predetermined by simulating the traffic situation 3.

In a second work step 102, the virtual traffic situation 3 is output to the first user 2 via a first user interface 12.

Figure 4:
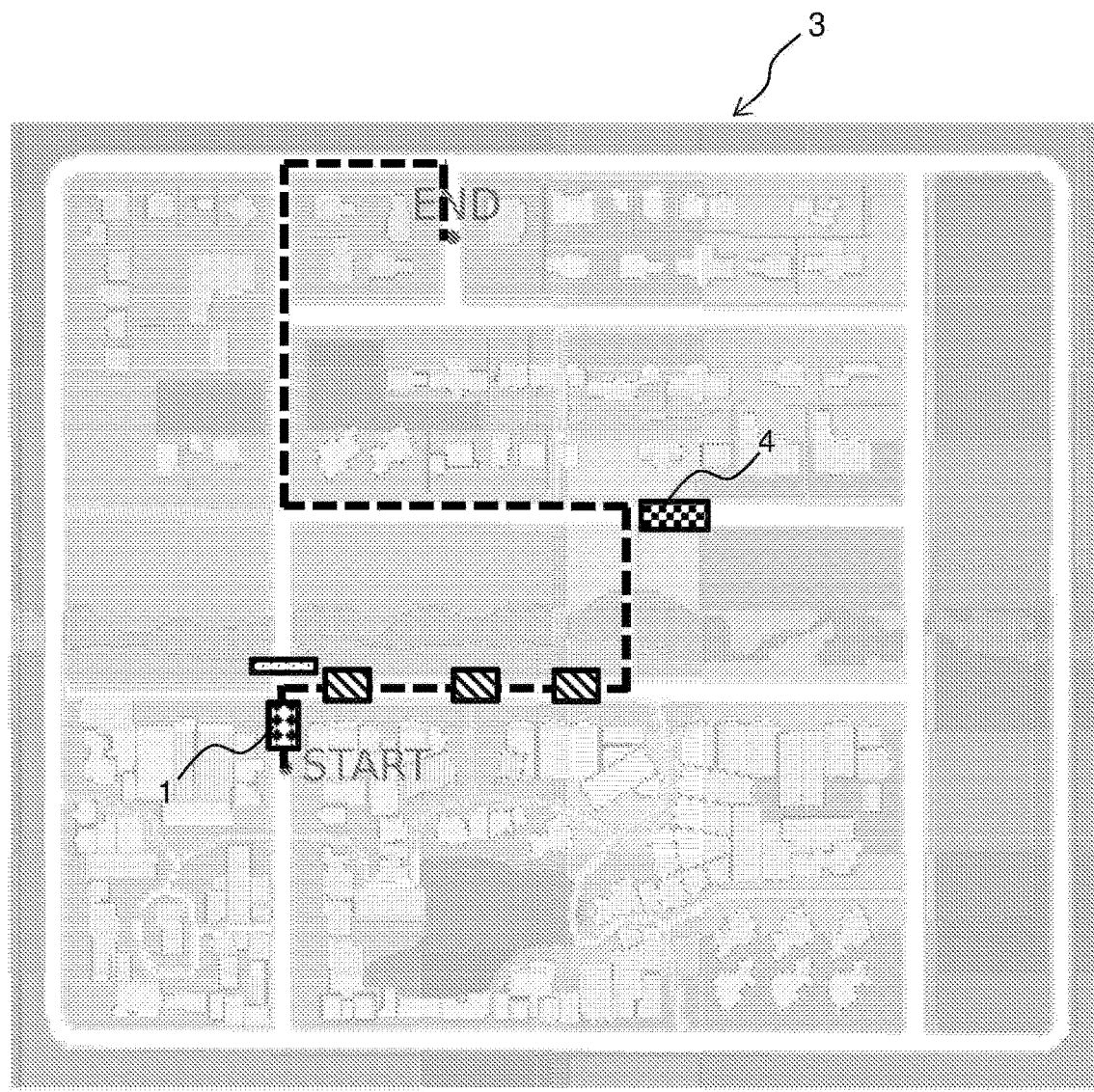
FIG. 4 a third example of a simulated virtual traffic situation.
Figure 4:
Figure 4:
Figure 4:
Figure 4:

Examples of possible user interfaces 12 are shown in FIG. 4 and preferably include visual user interfaces, in particular screens, audio user interfaces, in particular speakers, and/or a user interface for stimulating the sense of balance of first user 2.

In a third work step 103, inputs of the first user 2 for controlling the motorcycle 4 in a virtual environment of the first road user 1 are captured via a second user interface 13.

The second user interfaces 13 as well are shown in FIG. 4. Preferably, these relate to the steering wheel, a gear shift, a handbrake, a brake pedal, a clutch and/or a gas pedal as well as other possible control instruments available to a driver in a vehicle.

Depending on the type of road user 1, 4, 5a, 5b, 5c, 5d, 6 controlled by user 2, however, other input means can also be provided as the user interface 13, for example a type of joystick.

As explained above, the first road user 1 in FIGS. 3a and 3b is the motorcycle 4. The captured inputs of the first user 2 and the resulting interaction of motorcycle 4; i.e., the first road user, with its virtual environment factor into the simulating of the traffic situation 3 shown in FIGS. 3a and 3b.

The interaction in the traffic situations 3 shown in FIGS. 3a and 3b is, for example, how the first user 2 reacts to the initial scenario. Depending on the reaction of the first user 2 to this initial scenario, the other road users, in particular oncoming vehicle 1 as well as further oncoming vehicle 5a and pedestrian 6, will also react. For example, it is to be expected that the oncoming vehicle 1 will brake when the driver assistance system 7 notices that the vehicle 1 controlled by the first user 2 is not reducing its speed. These interactions in turn influence the development of the virtual traffic situation 3.

Figure 2:
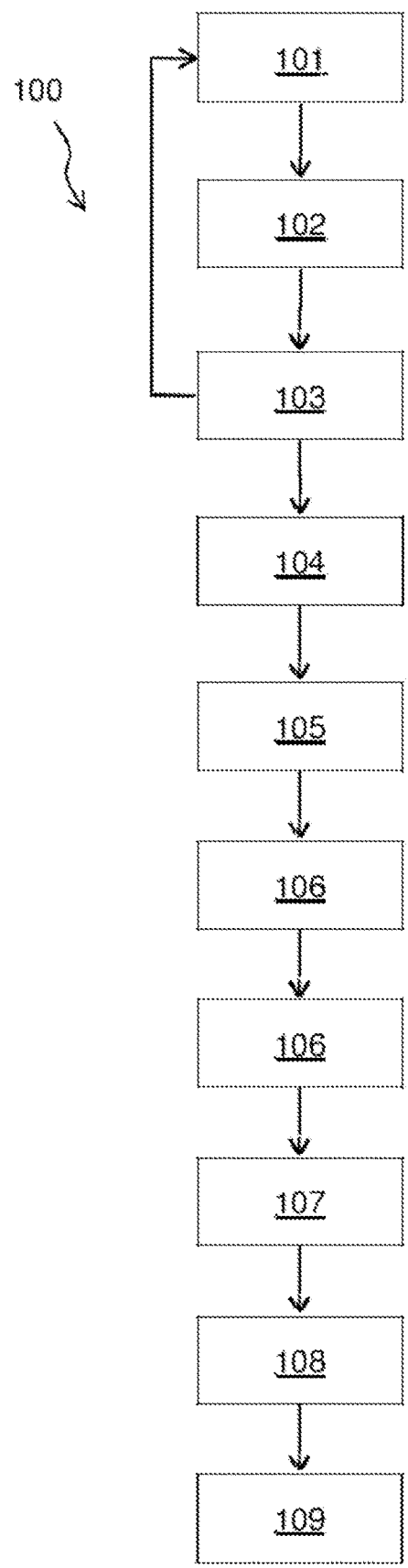
FIG. 2 a block diagram of an exemplary embodiment of a method for generating scenarios.

Generating the traffic situation 3 is therefore a continuous process which, as indicated in FIG. 2 by an arrow, continually runs in a loop and thereby generates simulation data.

During the simulation, the objects which are part of the virtual traffic situation 3 are preferably labeled. This relates to both static as well as dynamic objects. Subsequent data able to be obtained from the simulation data thereby includes the so-called ground truth information.

When the scenario data is used to test a driver assistance system 7, for example, one can follow which objects the driver assistance system 7 correctly detected and which it incorrectly detected. Examples of such labels are tree, pedestrian, passenger car, truck, etc.

Further preferably, actions are set in the driving situations 3 which prompt activity from the first user. For example, in the traffic situation 3 of FIGS. 3a and 3b, this could be a further vehicle following the motorcycle 4 driven by the first user 2 and coercing it to accelerate. An unexpected movement trajectory of the pedestrian 6, for example should he start to run, can also be such an action.

In a fourth work step 104, the driver assistance system 2, and with it the vehicle 1 it controls, is operated in a virtual environment of the vehicle which results from the position and orientation of the vehicle 1 in the simulated traffic 3 created by the simulation and the control of the motorcycle 4 by the first user 2. As described below, both the hardware of the driver assistance system 7 with or without sensors as well as only the software of the driver assistance system 7 can thereby be tested in operation. Missing hardware components can be simulated.

An example of such operation in the virtual environment is depicted in FIG. 4. The vehicle 1 with the function to be tested or driver assistance system 2 to be tested is operated in the virtual road system comprising at least one virtual traffic situation 3. On its way from the starting point to the predefined target point, the vehicle 1 has to drive around a construction site created by a user 2 to influence the traffic situation, steer through simulated traffic, cope with traffic from a vehicle 4 with a real driver, etc. The dashed path of travel thereby results as an example. The road system with the prepared traffic situation 2 is preferably a platform in which developers, e.g., a vehicle manufacturer, can drive their vehicle, preferably anonymously. Meaning that one can see which vehicles are driving autonomously but not the make and/or manufacturer. Preferably, not only function but also driving dynamics are thereby simulatively displayed. The users, which manually control road users can then let loose and try to fluster the driver assistance system 7 of vehicle 1.

Scenarios resulting from the driving behavior of the driver assistance system 7 relative to the vehicle 1 it controls in the traffic situation 3 or the environment of the vehicle 1 are captured in a fifth work step 105.

Both already known scenarios which have previously occurred or are predefined as templates as well as scenarios not yet predefined can thereby be checked.

Both types of scenarios are preferably defined by predefined constellations of simulated measured variables able to be determined from the virtual traffic situation 3. These predefined constellations either form the templates for scenarios or correspond to elementary maneuvers from which the occurrence of a scenario can be inferred. This could be a strong braking deceleration of vehicle 1 in FIGS. 3a and 3b, for example, this being used as a trigger condition for the occurrence of a scenario not yet having been predefined.

In a sixth work step 106, preferably a quality factor of the resulting scenario is determined as a function of a predefined criterion, wherein the quality factor is preferably characterized by the dangerousness of one of the scenarios. Preferably, the more dangerous the resulting scenario, the higher the quality factor. Dangerousness is preferably determined by so-called "time-to-X" metrics such as described for example in the "Metrics for assessing the criticality of traffic situations and scenarios" publication, P. Junietz et al., "11th Driver Assistance Systems and Automated Driving Workshop," FAS 2017. Particularly thereby able to be used as criteria: duration of time until a point of collision (time-to-collision), time-to-kickdown, time-to-steer, time-to-react, distance-of-closest-encounter, time-to-closest-encounter, worst-time-to-collision. Further preferably, the dangerousness is characterized by probability of an accident.

In a seventh work step 107, the determined quality factor is preferably output to the user 2 via one of the aforementioned interfaces. This can occur after each occurrence of a new scenario or after running through each newly created scenario. Preferably, however, this can only occur after running through a plurality of scenarios.

Further preferably, the first user 2 is credited with a reward, in particular a notional reward, as a function of a presented scenario's quality factor. Further preferably, the notional reward indicates the quality factor.

In an eighth work step 108, inputs of the first user are preferably captured via the first user interface 12 or the second user interface 13. These further inputs serve in changing the simulated traffic situation 3.

Preferably, the first user 2 can thereby change, replace or remove objects in the simulation of the traffic situation 3. He can moreover add new objects. The first user 2 can thereby attempt to configure the traffic situation 3 to be as complex as possible. Doing so enables him to be able to provoke driver assistance system 7 errors as the vehicle 1 is being driven. The user 2 could thus stipulate, for example, that the trailer of a truck, as a further road user, be of the same color as the sky in order to make it more difficult for an optical sensor of a driver assistance system to detect. The user can thereby preferably draw on a plurality of possibilities to modify the traffic situation. The following lists some examples used individually or together: changing the textures of objects (e.g. road sign printing on truck); setting up construction sites, e.g. with warning beacons in the middle of the road; running a dinosaur across the street (e.g. relevant at Carnival); deliberately positioning objects so as to overlap; a person dressed in white in front of a white wall; an injured person in the road; sirens or horns (acoustic sensors can also be provided with the driver assistance system).

Preferably, a type of editor is thereby used with which the first user 2 can configure the traffic situation 3. Further preferably, operations of the first user 2 are preferably recorded and stored in a control table. By doing so, it should be possible to determine which measures can be taken to create traffic situations 3 resulting in particularly complex scenarios.

The simulated traffic situation 3 is preferably changed in a ninth work step 109. This is either done based on the captured inputs of the first user 2 or preferably, however, algorithms can also be additionally or alternatively used to change the simulated traffic situation 3, particularly evolutionary algorithms. Preferably, only existing parameters of the traffic situation 3 are changed during said change. For example, the color or speed of existing objects. The basic design of the traffic situation 3, however, is maintained.

Feasible parameters that can be influenced: speed, in particular an initial speed, of a road user; direction of movement, in particular a road user's trajectory; lighting conditions; weather; road surface; temperature; number and position of static and/or dynamic objects; condition and appearance of static and/or dynamic objects; speed and direction of movement, in particular trajectory, of the dynamic objects; condition of signaling systems, in particular traffic light systems; traffic signs; number of lanes; acceleration or braking deceleration of road users or objects; signs of roadway dilapidation and/or aging; geographic orientation of the traffic situation. Particularly able to be changed are the colors, textures, forms and attire of objects and/or the position of the sun and the direction from which sunlight enters the traffic situation 3.

Although the method 100 for testing a driver assistance system 7 was described above with respect to one driver assistance system 7 under testing and one user 2 controlling a first road user 4, it is however also possible for the method 100 to be used to test driver assistance systems of multiple vehicles and/or for there to be multiple road users controlled by users. For example, the pedestrian 6 could be controlled by a second user. Meaning that multiple vehicles can be controlled in the simulated traffic situation by driver assistance systems and/or multiple further road users can be controlled by further users.

Figure 5:
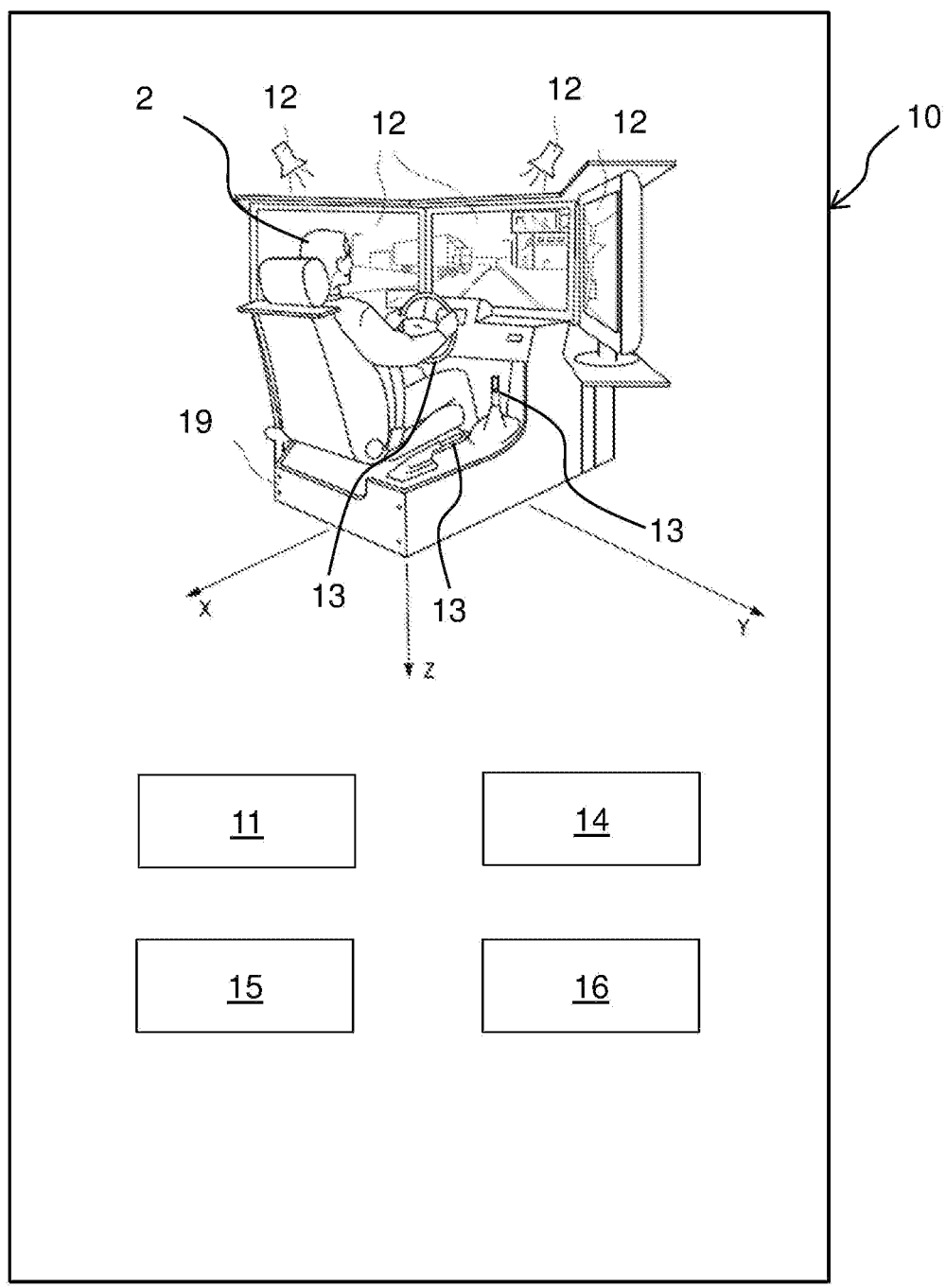
FIG. 5 an exemplary embodiment of a system for generating scenario data for testing a driver assistance system of a vehicle.

FIG. 5 depicts a system 10 for generating scenarios for testing a driver assistance system of a vehicle.

This system 10 preferably comprises means 11 for simulating a virtual traffic situation 3 having a plurality of virtual road users. In order for a road user 4 to be made controllable by a first user 2, the system further comprises at least one first user interface 12 and at least one second user interface 13.

The at least one first user interface or user interfaces 12 serve in outputting a virtual environment of at least one first road user 1 to the first user 2. The virtual environment of the at least one first road user 4 is thereby determined on the basis of the simulated virtual traffic situation 3. This is thereby substantially a representation of the virtual traffic situation 3 in the initial scenario from the perspective of the first road user 4 as controlled by the first user 2.

As FIG. 5 depicts, these user interfaces 12 are visual user interfaces such as screens and audio interfaces such as speakers and possibly also apparatus able to affect the sense of balance of the respective user 2.

The second user interface, user interfaces 13 respectively, are configured to capture inputs from the respective user 2. As FIG. 4 shows, these relate preferably to different operating elements. As already explained above, they can be dependent on the respective road user 1 controlled by the user 2. If the road user 1 controlled by the first user 2 is a vehicle, the user interfaces 12, 13 are preferably arranged in the area of a so-called seat box 19 which, as depicted in FIG. 4, forms a simulator together with the user interfaces 12, 13.

The system 10 preferably further comprises means 14 for operating the driver assistance system 2 in a virtual environment of the vehicle 1 on the basis of the simulated traffic situation 3. The driver assistance system 2 drives the vehicle 1 through the traffic situation 3 and thereby exhibits a certain driving behavior. Furthermore, the system 10 preferably comprises means 15 for determining/detecting a scenario resulting from the driving behavior of the driver assistance system 2 in the virtual environment of the vehicle 1. Further preferably, the system 10 preferably comprises means 16 for determining a quality factor of the simulated scenario of the resulting scenario as a function of a predefined criterion in relation to the resulting driving situation, in particular a dangerousness of the resulting driving situation of the resulting scenario. The first or second user interface 12,13, particularly a display, is further configured to output the quality factor to the user. Moreover, a data interface configured to output the scenario data for further processing can be provided. Preferably, the means 11, 14, 15, 16, 17, 18 are part of a data processing device preferably formed by a computer.

Figure 6:
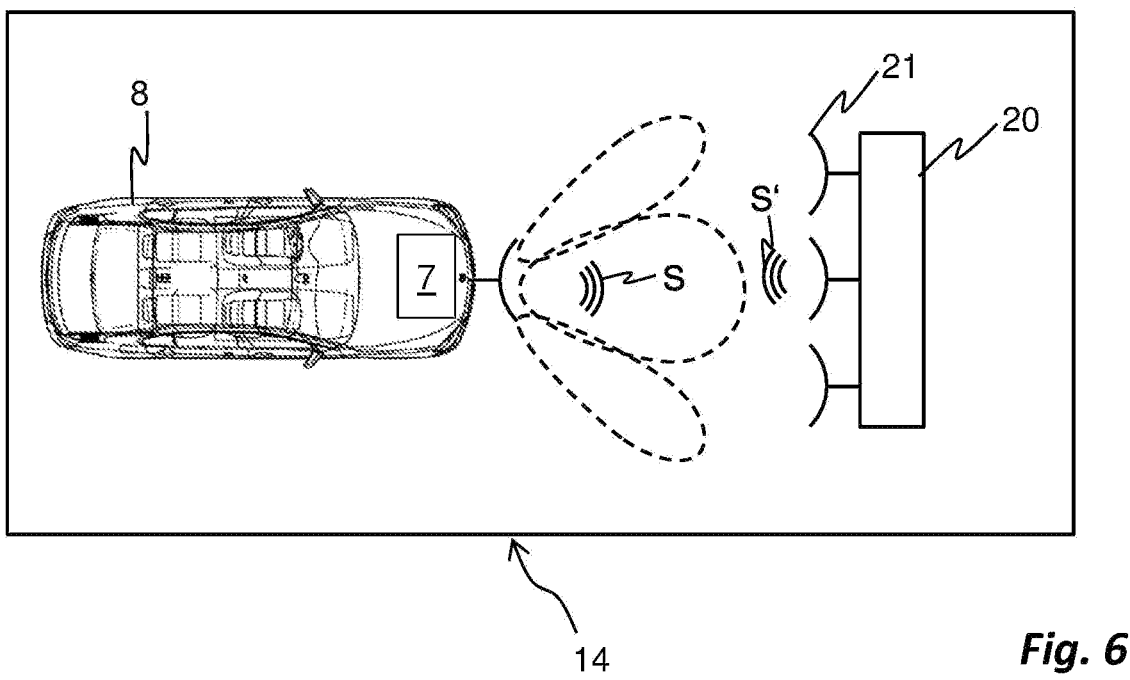
FIG. 6 an exemplary embodiment of means for operating a driver assistance system.

A means 14 for operating a driver assistance system 7 is shown again in FIG. 6 in detail.

Such a means 14 preferably comprises a device 20 configured to simulate a virtual environment of the vehicle 1 on the basis of the scenario data. Furthermore, the means 20 is also configured to render this environment.

An interface 21 is configured to output or respectively emulate the virtual environment of a driver assistance system. If the driver assistance system 7 has an optical camera, such an interface 21 can be a screen.

In the example depicted in FIG. 6, the sensor of the driver assistance system 7 is a radar sensor which emits a signal S. This signal S is picked up by radar antennas 21 which form the interface.

Based on the acquired signal and the simulated environment, the simulating means 20 calculates a response signal S' which is in turn output to the radar of the driver assistance system 7 via radar antennas. So doing enables testing the function of the driver assistance system 7. Depending on which components of a driver assistance system 7 are to be tested, the simulated virtual environment can be tested by emulating signals to the sensor of the driver assistance system 7, as shown in FIG. 6.

Alternatively, however, a signal S' fed directly into the data processing unit 7 of the driver assistance system can also be generated as well as a signal S' which is only processed by the software of the driver assistance system 7.

It should be noted that the exemplary embodiments are only examples which are in no way intended to limit the scope of protection, application and configuration. Rather, the foregoing description is to provide the person skilled in the art with a guideline for implementing at least one exemplary embodiment, whereby various modifications can be made, particularly as regards the function and arrangement of the described components, without departing from the scope of protection as results from the claims and equivalent combinations of features.

What is claimed is:

1. A computer-implemented method for testing a driver assistance system of a vehicle the method comprising:
   simulating, by a computing unit, a virtual traffic situation comprising the vehicle and at least one further road user, wherein a first road user of the vehicle can be controlled by a first user and wherein any of the at least one further road user not able to be controlled by other users are automatically controlled;
   outputting a virtual environment of the first road user on the basis of the virtual traffic situation to the first user via a first user interface;
   capturing inputs of the first user for controlling the first road user in the virtual environment of the first road user via a second user interface, wherein the captured inputs of the first user and an interaction of the first road user with the virtual environment are factored into the simulating of the virtual traffic situation;
   displaying, by the driver assistance system, a driving behavior based on operation of the driver assistance system in the virtual environment of the vehicle on the basis of the simulated virtual traffic situation;

capturing a scenario resulting from the driving behavior of the driver assistance system in the virtual environment of the vehicle;

determining, by the computing unit, a quality factor of the scenario as a function of a dangerousness of the resulting scenario;

outputting the quality factor to the first user via the first user interface or the second user interface; and changing the scenario on the basis of the determined quality factor by at least one of the captured inputs of the first user and algorithms until the quality factor of the scenario reaches an abort condition.

2. The method according to claim 1, further comprising: capturing inputs of the first user via the first user interface or the second user interface for changing the simulated virtual traffic situation.

3. The method according to claim 2, wherein only values of existing parameters of the simulated virtual traffic situation are changed when changing the simulated virtual traffic situation.

4. The method according to claim 1, wherein a speed of the vehicle and/or the at least one further first road user, and/or a trajectory of the vehicle and/or the at least one further first road user, is predefined by the simulation.

5. The method according to claim 1, wherein parameters of the scenario are selected from the following group depending on the driver assistance system to be tested:

speed of a particular road user; direction of movement of a particular road user; lighting conditions; weather; road surface; temperature; number and position of static and/or dynamic objects; condition and appearance of static and/or dynamic objects; speed and direction of movement of the dynamic objects; condition of signaling systems; traffic signs; number of lanes; acceleration or braking deceleration of road users or objects; signs of roadway dilapidation and/or aging; and geographic orientation of the virtual traffic situation.

6. The method according to claim 1, wherein the quality factor is characterized by a reward for the first user.

7. The method according to claim 1, wherein the higher the quality factor is, the more dangerous the scenario is.

8. The method according to claim 1, wherein the scenario is changed using evolutionary algorithms.

9. The method according to claim 1, wherein a utility function is approximated on the basis of the determined quality factor which specifies a quality factor value exhibited by a specific scenario.

10. The method according to claim 1, wherein the driver assistance system is simulated.

11. The method according to claim 1, wherein historical data from earlier test operations of the driver assistance system are factored into an initial capturing of the scenario.

12. The method according to claim 1, wherein data relating to the virtual environment of the vehicle is fed into the driver assistance system during the operation of the driver assistance system.

13. A computer program containing commands which, when run on a computer, prompts the computer to execute the steps of the method according to claim 1.

14. A non-transitory, computer-readable medium on which the computer program according to claim 13 is stored.

15. The method of claim 1, wherein the dangerousness of the resulting scenario is characterized by a time-to-X metrics or by probability of an accident.

16. A system for generating scenario data for testing a driver assistance system of a vehicle, the system comprising:

a computing unit simulating a virtual traffic situation comprising the vehicle and at least one further road user, wherein a first road user of the vehicle can be controlled by a first user and any of the at least one further road user not able to be controlled by other users are automatically controlled;

a first user interface for outputting a virtual environment of the first road user to the first user on the basis of the virtual traffic situation; and a second user interface for capturing inputs of the first user for controlling the first road user in the virtual environment of the first road user, wherein the captured inputs of the first user and an interaction of the first road user with the virtual environment are factored into the simulating of the virtual traffic situation;

the driver assistance system displaying a driving behavior based on operation of the driver assistance system in the virtual environment of the vehicle on the basis of the simulated virtual traffic;

the computing unit capturing a scenario resulting from the driving behavior of the driver assistance system in the virtual environment of the vehicle; means for the computing unit determining a quality factor of the scenario as a function of a predefined criterion; and the computing unit changing the scenario on the basis of the determined quality factor by at least one of the captured inputs of the first user and algorithms until the quality factor of the scenario reaches an abort condition;

wherein the first user interface or the second user interface is further configured to output the quality factor to the first user.

* * * * *